US005525189A

United States Patent [19]

Villers

[11] Patent Number: 5,525,189

[45] Date of Patent: Jun. 11, 1996

[54] HAND TOOL FOR LAYING SHEET AND WOVEN MATERIALS

[76] Inventor: Lawrence Villers, 15527 Portage St., Doylestown, Ohio 44230

[21] Appl. No.: 218,677

[22] Filed: Mar. 28, 1994

[51] Int. Cl.[6] ...................... B32B 31/00

[52] U.S. Cl. ...................... 156/579; 15/245.1

[58] Field of Search ...................... 156/574, 575, 156/577, 579, 94; 118/56; 15/245, 245.1, 235.4, 235.6, 236.01, 150, 250.42, 257.05

[56] References Cited

U.S. PATENT DOCUMENTS

| | | | |
|---|---|---|---|
| 701,727 | 6/1902 | Holmes | 156/577 |
| 1,144,891 | 6/1915 | Cannon | 15/245.1 |
| 1,555,145 | 9/1925 | Naslin | 15/245 |
| 1,575,318 | 3/1926 | Cowan | 15/245.1 X |
| 2,158,695 | 5/1939 | Foss | 15/245 |
| 2,681,464 | 6/1954 | Baril | 15/245 |
| 3,119,138 | 1/1964 | Davis | 15/245.1 |

*Primary Examiner*—James Engel
*Attorney, Agent, or Firm*—Standley & Gilcrest

[57] ABSTRACT

In broadest terms, the present invention is a hand tool, the tool having: (1) a handle portion; and (2) an elongated head portion attached to the handle portion and having a plurality of substantially parallel flexible rubber strips distending from said head portion. It is preferred that the head portion have a substantially straight flexible rubber portion having a plurality of substantially parallel flexible rubber strips distending from said flexible rubber portion. The head portion and flexible rubber strips most preferably being in the form of a single piece of rubber which may be made by cutting a series of slots into a single piece of rubber as described more fully herein. It is also preferred that the flexible rubber strips be rectangular in shape.

13 Claims, 2 Drawing Sheets

HAND TOOL FOR LAYING SHEET AND WOVEN MATERIALS

BACKGROUND OF THE INVENTION

The present invention is a hand tool which may be used for laying sheet-like materials and woven materials such as those materials used in the roofing or flooring trades.

In many construction activities it is often necessary for workers to lay sheet-like materials and woven materials. Such sheet-like and woven materials are typically supplied in large sheets or rolls. Examples include sheet plastic, woven roving, carpeting, felt, etc.

One such construction activity is the laying of roofing materials. In typical build-up or layered roof constructions, it is normally necessary to lay, in sequence, several layers of sheet-like material, such as roofing felt, fiberglass, etc. These layers are adhered to the surface of the building structure and/or to one another through the use of any of a wide variety of adhesives, resins, tar etc., so as to provide a finished and sealed roof composite structure.

The layered nature of these composites requires that nonuniformities in the layered sheets be smoothed as each successive layer is put down to assure that all areas of each sheet are well sealed to adjacent layers. More complete and uniform sealing minimizes air spaces which, through bubble formation, can weaken the roof composite, and lead to leaking or puddling. Also, nonuniformities left unremoved can express themselves through the entire composite, leading to irregularities in the finished surface which also cause puddle formation. It is therefore often necessary to smooth the newly placed layers through the application of uniform and gentle pressure. In order to best be able to smooth the layer and remove nonuniformities, it is often most desirable to smooth the layer in a given direction to remove bubbles and to predictably position the layer.

Another cause of nonuniformity in roofing composites is any weight or localized stress brought to bear on fleshly placed layers. Localized stresses can occur as a result of workers walking on, or otherwise bringing weight to bear upon the freshly laid layer. Another potential source of nonuniformities is in cases where tooling or other objects are impressed against the newly placed layer so as to depress a portion of the layer to a greater extent than surrounding areas of the layer.

Other dangers to be avoided it laying and smoothing roofing layers are snagging and puncture. Snagging the unadhered layers can cause them to be pulled out of position, or cause pleats or wrinkles. Punctures can of course affect the integrity of the finished composite, mad may lead to bubbling or leaking.

Accordingly, it is an object of the present invention to provide a hand tool which may be used in a wide variety of sheet-laying or sheet-rolling operations.

It is also an object of the present invention to provide a hand tool which will allow one to lay, and to gently and directionally smooth, sheet-like and woven materials without walking on the material, and while avoiding localized stress on the newly placed layers.

It is also an object of the present invention to be able to provide a hand tool capable of being adjusted for directional application of pressure, or to accommodate the traveling path of the user.

In light of the present disclosure or through use of the present invention, other advantages may become apparent to the user.

SUMMARY OF THE INVENTION

In broadest terms, the present invention comprises a hand tool, the tool comprising: (1) a handle portion; and (2) an elongated head portion attached to the handle portion and comprising a plurality of substantially parallel flexible rubber strips distending from said head portion. It is preferred that the head portion comprise a substantially straight flexible rubber portion having a plurality of substantially parallel flexible rubber strips distending from said flexible rubber portion. The head portion and flexible rubber strips most preferably being in the form of a single piece of rubber which may be made by cutting a series of slots into a single piece of rubber as described more fully herein.

It is also preferred that the flexible rubber strips be rectangular in shape.

The dimensions may be varied in accordance with the desired application.

The handle may be any length appropriate to the use of the tool, such as for reaching over sheet materials of lesser or greater width.

Preferably, the head portion will comprise a substantially straight flexible rubber portion having a width in the range of from about 3 feet to about 5 feet, and each of said plurality of substantially parallel flexible rubber strips has a length in the range of from about 3 to about 6 inches. Typically, the ratio of the length of the head portion to the length of the flexible rubber strips is in the range of from about 3:1 to about 5:1.

The width of said flexible rubber strips typically is in the range of from about one half inch to about three inches, and the thickness of the flexible rubber strips normally is in the range of from about one eighth inch to about three fourths inch. The flexible rubber strips may be directly adjacent, or separated by a distance of from about one eighth inch to about one inch.

Depending on the application, the dimensions of the head portion components may be varied to fit the desired application. For example, shorter rubber strips may impart greater stiffness to the flexible rubber strips, while providing thicker rubber will increase the weight of the head portion.

For roofing applications, a most preferred head portion is about 3 to 4 feet in length, having a plurality of substantially parallel, rectangular flexible rubber strips of about 6 to 8 inches in length, 1 to 2 inches in width, ¼ to ½ inch thick and separated from one another by a distance of ¼ to ½ inch. The rubber used in head portions of these preferred dimensional range preferably neoprene rubber, such as that commercially available from Goodyear Tire and Rubber Company of Akron, Ohio.

The handle of the tool may be permanently attached to the head portion at a right angle or at an acute angle thereto. When acutely angled, typically between 45 and 90 degrees, the tool may be used by walking alongside the sheet-like or woven material while maintaining the longitudinal axis or the head portion substantially perpendicular to the direction of its travel. An angled handle also allows the user to maintain the head portion at an angle to its direction of travel to achieve a "snow plow" effect in removing air or nonuniformities such as wrinkles, folds or pleats.

In a most preferred embodiment, the head portion of the present invention is attached to said handle portion at an attachment point by adjustment means whereby the angle formed at the attachment point between said head portion and said handle portion may be varied. This embodiment permits use of the tool in either perpendicular or acutely angled mode.

DETAILED DESCRIPTION OF THE PREFERRED EMBODIMENT

In accordance with the foregoing summary of the invention, the following presents a detailed example of the preferred embodiment of the present invention which is also presently considered to be the best mode of the invention.

Figure 1:
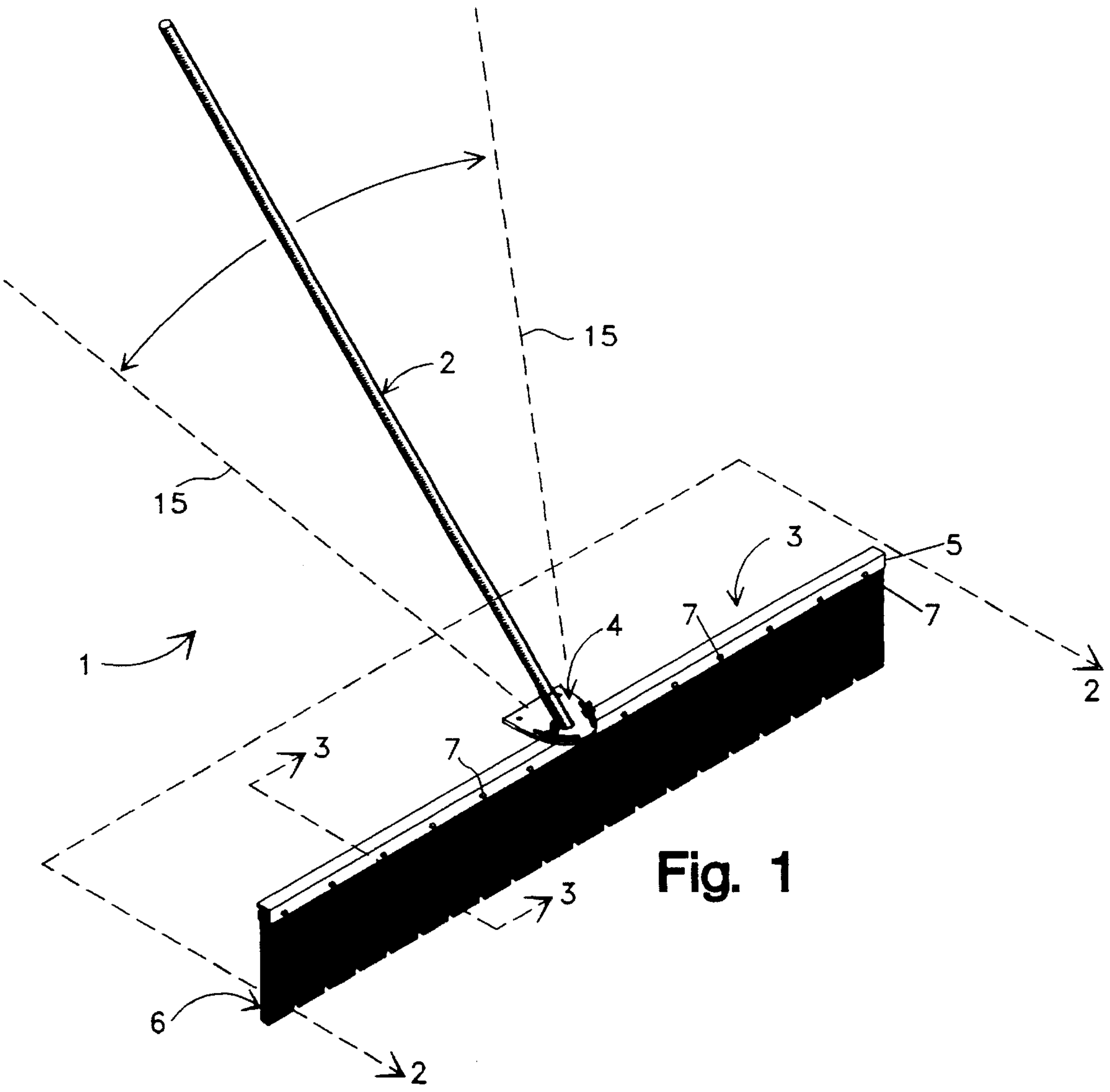
FIG. 1 is a perspective view of a hand tool in accordance with one embodiment of the present invention.

FIG. 1 shows a perspective view of a hand tool 1 in accordance with one embodiment of the present invention. Hand tool 1 has handle portion 2 and head portion 3, which are held together by attachment clamp assembly 4. The handle portion 2 may be made of any appropriate material such as wood or metal. Head portion 3 comprises a front metal frame portion 5 which supports rubber head portion 6. The rubber head portion is preferably made of black neoprene rubber, such as that commercially available from Goodyear Tire and Rubber Company of Akron, Ohio. The front metal frame 5 and rubber head portion 6 are provided with a series of holes through which bolts 7 pass.

Figure 2:
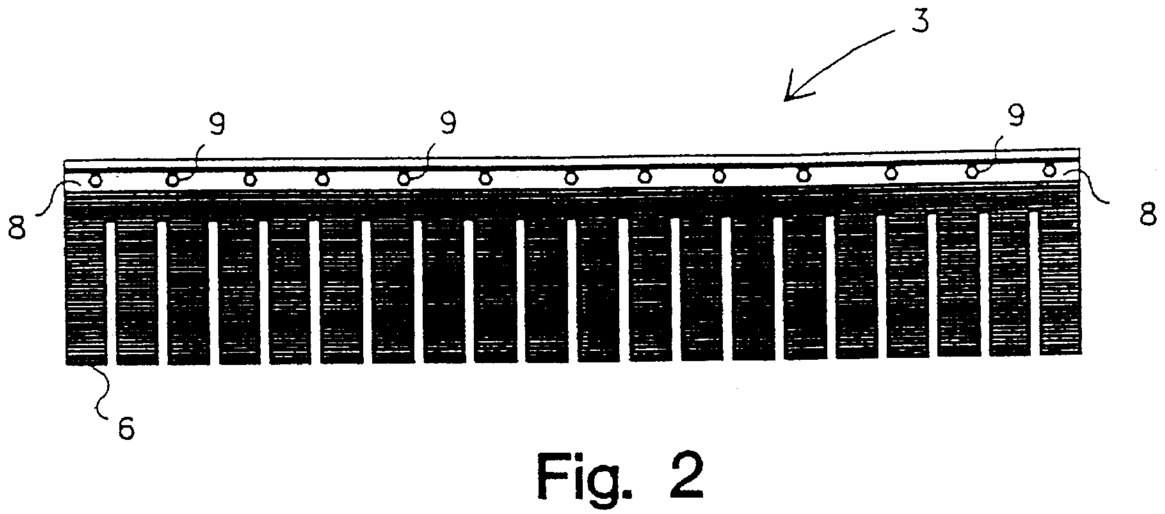
FIG. 2 is a elevational view of the side of the head portion opposite that seen in FIG. 1.

FIG. 2 shows a view along line 2—2 of FIG. 1 of the opposite side of the head portion 3 shown in FIG. 1 (shown without handle 2 and attachment clamp assembly 4). FIG. 2 shows the other component of head portion 3, rear metal frame portion 8. Rear metal frame portion 8 is likewise provided with a series of holes through which bolts 7 pass. Bolts 7 are provided with nuts 9 to close rubber head portion 6 between front metal frame portion 5 and rear metal frame portion 8.

Figure 3:
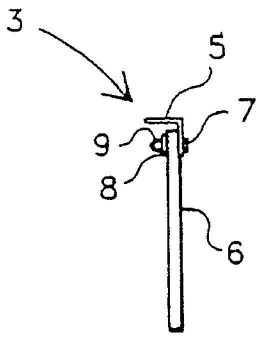
FIG. 3 is a lateral elevational view of the head portion of a hand tool in accordance with one embodiment of the present invention.

FIG. 3 shows a lateral view along line 3—3 of FIG. 1 of the head portion 3 shown in FIG. 1 (also shown without handle 2 and attachment clamp assembly 4). This view more clearly illustrates head portion 3 and the relationship of front metal frame portion 5, rear metal frame portion 8, rubber head portion 6, bolts 7 and nuts 9.

Figure 4:
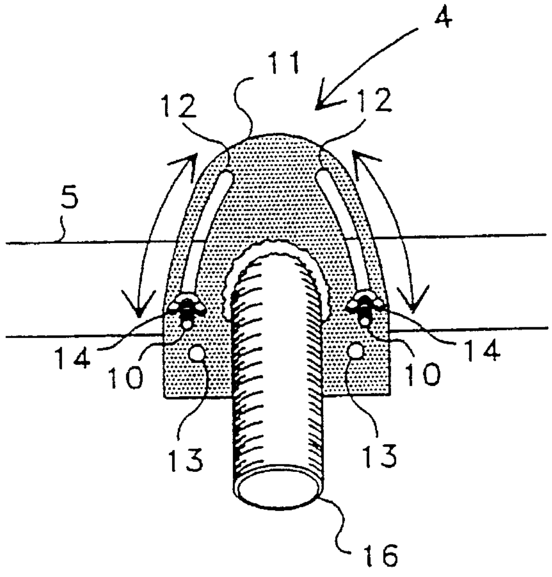
FIG. 4 is a detailed view of the handle attachment means of a hand tool in accordance with one embodiment of the present invention.

FIG. 4 shows a detail of a plan view of attachment clamp assembly 4. FIG. 4 shows front metal frame portion 5 from which extend threaded posts 10 providing a portion of the attachment clamp assembly 4, and typically attached to front metal frame portion 5 by welding. Attachment clamp assembly 4 also comprises flange portion 11 which contains arcuate apertures 12 and round apertures 13, both of which are adapted to accept threaded posts 10. Threaded posts 10 are also provided with wing nuts 14. In the configuration shown in FIG. 4, the attachment clamp assembly 4 may be configured either to have the handle locked at a given angle to the longitudinal axis of the head portion 3 (such as at a 90 degree angle by locking threaded posts 10 respectively into round apertures 13; yielding the configuration shown in FIG. 1 ). As an alternative, threaded posts 10 may be placed respectively into arcuate apertures 12 thereby allowing the handle to be swiveled between and locked into any configuration at any desired angle to the longitudinal axis of the head portion 3 (such as at an angle represented by the dotted lines 15 in FIG. 1.

To metal flange portion 11 is also welded tubular sleeve portion 16 adapted to accept and be attached to handle portion 2, such as by adhesive or perpendicular locking screws which would pass through the sleeve portion 16 and into handle portion 2 (not shown).

Accordingly, the design of this embodiment of the present invention allows the operator to chose from any setting from normal to the longitudinal axis of the head portion 3 to an acute angle thereto (typically no less than 45 degrees).

In light of the foregoing disclosure and through actual practice of the invention, it will be within the ability of one of ordinary skill in the art to make modifications and alterations, such as through the integration and disintegration of parts and the use of alternative geometries, to practice the invention without departing from the spirit of the invention as reflected in the appended claims.

What is claimed is:

1. A hand tool, said tool comprising:

a handle portion; and an elongated head portion attached to said handle portion and having a longitudinal axis, said head portion comprising:

a substantially straight flexible rubber portion having a length in the range of from about 3 feet to about 5 feet, and a plurality of substantially parallel rectangular, independently flexible rubber strips, disposed in a series along said longitudinal axis, distending from said flexible rubber portion, wherein the ratio of the length of said straight flexible rubber portion to the length of said flexible rubber strips is in the range of from about 3:1 to about 5:1.

2. A hand tool according to claim 1 said head portion, wherein each of said plurality substantially parallel flexible rubber strips has a length in the range of from about 3 to about 6 inches, and a width in the range of from about one half inch to about three inches.

3. A hand tool according to claim 1 wherein the thickness of said flexible rubber strips is in the range of from about one eighth inch to about three fourths inch.

4. A hand tool according to claim 1 wherein said flexible rubber strips are separated by a distance of from about one eighth inch to about one inch.

5. A hand tool according to claim 1 wherein said head portion is attached substantially perpendicular to said handle portion.

6. A hand tool according to claim 1 wherein said head portion is attached at an acute angle to said handle portion.

7. A hand tool according to claim 1 wherein said head portion is attached to said handle portion at an attachment point by adjustment means whereby the angle formed at the attachment point between said head portion and said handle portion may be varied.

8. A hand tool according to claim 4 wherein said angle formed at said attachment point may be varied between about 45 and about 90 degrees.

9. A hand tool, said tool comprising:

a handle portion; and an elongated head portion attached to said handle portion having a longitudinal axis, said head portion comprising:

a substantially straight flexible rubber portion having a length in the range of from about 3 feet to about 5 feet, and a plurality of substantially parallel, rectangular, independently flexible rubber strips, disposed in a series along said longitudinal axis, distending from said straight flexible rubber portion, said flexible rubber strips having a length in the range of from about 3 to about 6 inches, a width in the range of from about one half inch to about three inches, and a thickness in the range of from about one eighth inch to about three fourths inch; and wherein said flexible rubber strips are separated by a distance of from about one eighth inch to about one inch.

10. A hand tool according to claim 9 wherein said head portion is attached substantially perpendicular to said handle portion.

11. A hand tool according to claim 9 wherein said head portion is attached at an acute angle to said handle portion.

12. A hand tool according to claim 9 wherein said head portion is attached to said handle portion at an attachment point by adjustment means whereby the angle formed at the attachment point between said head portion and said handle portion may be varied.

13. A hand tool according to claim 4 wherein said angle formed at said attachment point may be varied between about 45 and about 90 degrees.

* * * * *